(12) United States Patent  
Sinha

(10) Patent No.: US 9,210,161 B2  
(45) Date of Patent: Dec. 8, 2015

(54) AUTHENTICATION CERTIFICATES AS SOURCE OF CONTEXTUAL INFORMATION IN BUSINESS INTELLIGENCE PROCESSES

(75) Inventor: Anand Sinha, Bangalore (IN)

(73) Assignee: Business Objects Software Limited, Dublin (IE)

(*) Notice: Subject to any disclaimer, the term of this patent is extended or adjusted under 35 U.S.C. 154(b) by 333 days.

(21) Appl. No.: 13/324,805

(22) Filed: Dec. 13, 2011

(65) Prior Publication Data

US 2013/0151847 A1    Jun. 13, 2013

(51) Int. Cl.
*G06F 7/04* (2006.01)
*H04L 29/06* (2006.01)

(52) U.S. Cl.
CPC ................... *H04L 63/0823* (2013.01)

(58) Field of Classification Search
CPC ....................................... H04L 9/006
USPC ........................... 726/1–21, 26–30
See application file for complete search history.

(56) References Cited

U.S. PATENT DOCUMENTS

| 6,691,100 | B1* | 2/2004 | Alavi et al. ........................... 1/1 |
| 6,976,164 | B1* | 12/2005 | King et al. .................... 713/156 |
| 8,024,339 | B2 | 9/2011 | Barker et al. |
| 2001/0021928 | A1* | 9/2001 | Ludwig et al. ................... 705/67 |
| 2004/0098595 | A1* | 5/2004 | Aupperle et al. ............. 713/185 |
| 2007/0266368 | A1* | 11/2007 | Szpak et al. ................... 717/105 |
| 2010/0250566 | A1* | 9/2010 | Paul ............................... 707/756 |
| 2011/0040805 | A1* | 2/2011 | Carter et al. ................... 707/808 |
| 2011/0264729 | A1* | 10/2011 | Kulgavin ....................... 709/203 |
| 2013/0081129 | A1* | 3/2013 | Niemela ......................... 726/11 |

FOREIGN PATENT DOCUMENTS

WO    WO 2005/062809    7/2005

OTHER PUBLICATIONS

Medjahed et al. "Business-to-business interactions: issues and enabling technologies" The VLDB Journal—The International Journal on Very Large Data Bases, vol. 12 Issue 1, May 2003, pp. 59-85.*
Bhide et al. "Enhanced Business Intelligence using EROCS" Data Engineering, 2008. ICDE 2008. IEEE 24th International 2008, pp. 1616-1619.*
Grandison, Tyrone; and Sloman, Morris, 2000 "A survey of trust in internet applications" Communications Surveys & Tutorials, IEEE, vol. 3, No. 4, pp. 2-16, ISSN 1553-877X, DOI 10.1109/COMST.2000.5340804, HTTP://TINYURL.COM/68GSDHF.

* cited by examiner

*Primary Examiner* — Roderick Tolentino
(74) *Attorney, Agent, or Firm* — Mintz Levin Cohn Ferris Glovsky and Popeo, P.C.

(57) ABSTRACT

A certificate of a user is presented by a client to a server. The certificate is used to authenticate communications between the client and the server. Thereafter, data from the certificate is cached at the server. The server then initiates one or more business intelligence processes of a business intelligence application at the client using the cached data to provide context to the one or more business intelligence processes. Related apparatus, systems, techniques and articles are also described.

18 Claims, 4 Drawing Sheets

AUTHENTICATION CERTIFICATES AS SOURCE OF CONTEXTUAL INFORMATION IN BUSINESS INTELLIGENCE PROCESSES

TECHNICAL FIELD

The subject matter described herein relates to the use of authentication certificates as a source of contextual information in business intelligence processes executed by business intelligence applications.

BACKGROUND

Software systems and applications are increasingly used to improve business enterprise decision-making and governance. Business Intelligence (BI) software tools provide techniques for analyzing and leveraging enterprise applications and data. These tools are commonly applied to financial, human resource, marketing, sales, service provision, customer and supplier analyses. More specifically, these tools can include reporting and analysis tools to analyze, forecast and present information, content delivery infrastructure systems for delivery, storage and management of reports and analytics and integration tools to analyze and generate workflows based on enterprise systems. BI tools work with data management systems, such as relational databases or On-Line Analytic Processing (OLAP) systems used to collect, store, and manage raw data and transactional enterprise systems that generate data.

Reporting tools and other business intelligence applications allow a user to explore business data by consolidating raw data from disparate sources, performing calculations on the data (e.g., aggregate, subtract, etc.) and specifying various views of the underlying data (e.g., specifying various dimensions and measures along which they would like to dissect data). In addition to having wide control over how to manipulate raw data to view the exact dimensions and measures of interest, business users want to be able to display reports whose underlying data can change based on contextual information.

BI applications are increasingly using contextual information to provide an experience adapted for each particular user. This is especially the case with large enterprises that have large number of users using particular BI applications. Contextual information, as used herein, can take many different forms. It can be geographic (e.g., user location, location of an object of interest), some information descriptive of natural conditions (e.g., temperature variation) and other information that could define the context of use of the data and/or the device being used by the end user. Changes in such contextual information can influence change various aspects of the BI application including what is being displayed and/or access given to the user. However, interjecting such contextual information into BI processes such as reports often require manual intervention by a user and/or polling of a remote data source. Such actions can negatively impact the usability of BI processes and/or the performance of BI processes.

SUMMARY

In one aspect, a certificate of a user is presented by a client to a server. The certificate is used to authenticate communications between the client and the server. Thereafter, data from the certificate is cached at the server. The server then initiates one or more business intelligence processes of a business intelligence application at the client using the cached data to provide context to the one or more business intelligence processes.

The certificate can comprise an authentication certificate such as an X.509 authentication certificate. With such implementations, the cached data can comprise values from at least one of a SUBJECT field and SUBJECT ALTERNATIVE NAME field of the X.509 authentication certificate. The SUBJECT field can comprise sub-fields such as country, organization, organizational unit, distinguished name qualifier, state or province name, common name, and serial number. Similarly, the SUBJECT field can comprise sub-fields such as locality, title, surname, given name, initials, pseudonym, and serial number.

The SUBJECT ALTERNATIVE NAME field can comprise sub-fields such as electronic mail address, DNS name, IP address, and uniform resource identifier. The cached data can be data associated with a user such as: country, organization, organizational unit, distinguished name qualifier, state or province name, common name, serial number, locality, title, surname, given name, initials, pseudonym, serial number, electronic mail address, DNS name, IP address, and uniform resource identifier.

The contextual information can be used to answer a prompt value required by the business intelligence process and/or to filter an output of the business intelligence process (such as a report). The contextual information can be used to perform a search as part of the business intelligence process. The contextual information can be used to specify a join of tables in at least one database accessed by the business intelligence process.

In an interrelated aspect, values from a certificate of a user are transmitted by a client to a server. Such a certificate is used to authenticate communications between the client and the server. Thereafter, data comprising at least a portion of the transmitted values are cached at the server. The server then initiates one or more business intelligence processes of at least one business intelligence application at the client using the cached data. The cached data is used to provide context to the one or more business intelligence processes.

In still a further interrelated aspect on or more business processes of at least one business intelligence application are initiated. Such business processes are executed solely on the client (as opposed to a distributed execution partially on a remote server). Thereafter, the client accesses one or more locally stored certificates that are used to authenticate communications between the client and a remote server. The client then uses the data from the accessed one or more locally stored certificates to provide contextual information to the one or more initiated business processes.

Articles of manufacture are also described that comprise computer executable instructions permanently stored (e.g., non-transitorily stored) on computer readable media, which, when executed by a computer, causes the computer/data processor(s) to perform operations herein. Similarly, computer systems are also described that may include at least one processor and a memory coupled to the at least one processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the current subject matter automatically obtains contextual information for a user which allows for enhanced user experiences such as reports that are automatically filtered for the user. The contextual information can also be used to automatically grant or limit access to a particular user to certain processes/data (based on, for example, his or her role and/or authorization level). Moreover, in some cases, contextual information is more rapidly obtained as compared to having a user manually input relevant information and/or by polling one or more data sources (thereby increasing performance of business intelligence systems). Such an arrangement is particularly advantageous on mobile platforms (e.g., smart-phones, tablet computers, etc.) which often utilize slower communications networks and/or include interfaces for which it is more burdensome for the user to enter contextual information.

The details of one or more variations of the subject matter described herein are set forth in the accompanying drawings and the description below. Other features and advantages of the subject matter described herein will be apparent from the description and drawings, and from the claims.

DETAILED DESCRIPTION

Authentication certifications, such as X.509 authentication certificates can be used to uniquely identify a user, and perform a Single-Sign-On (SSO) for that user for protected resources. With SSO, a user can log in once and, by presenting a corresponding authentication certificate, gain access to all systems without being prompted to log in again at each of them. SOS is the reverse property in which a single action of signing out terminates access to multiple software systems.

Figure 1:
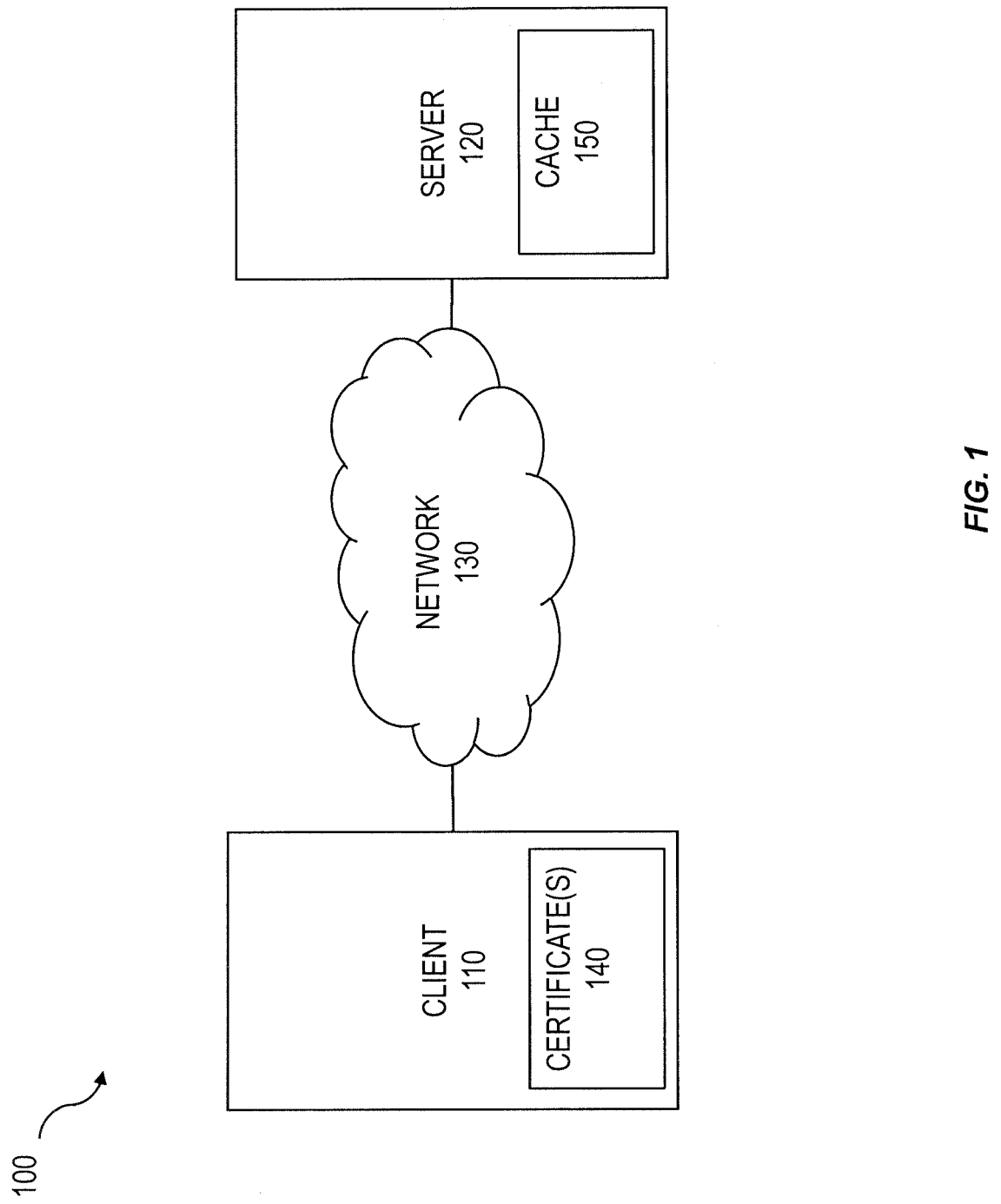
FIG. 1 is a diagram illustrating a system including a client and a server.

With reference to diagram 100 of FIG. 1, digital certificate(s) 140 (or identity certificates) can be installed on a client side 110 (on a desktop, in a browser, or on a mobile device). The certificates 140 can be presented to a remote server 120 (via a network 130 coupling the client 110 and the server 120) for authentication purposes such as SSL handshakes for validation and other authentication purposes. In many cases, these certificates 140 are additionally used for authorization purposes (i.e., used for authorizing access to certain data, etc.).

A digital certificate 140 can contain many fields for the above-mentioned purposes. These fields can include various values which characterize the user. One example are the fields detailed in Internet Engineering Task Force, RFC 5280 (a version of a standard specifying an Internet X.509 Public Key Infrastructure Certificate and Certificate Revocation List (CRL) Profile).

The current subject matter utilizes data from two fields typically found in authentication certificates 140, namely "SUBJECT" and "SUBJECT ALTERNATIVE NAME". It will be appreciated that other fields from authentication certificates 140 may also be used as a source of contextual information. In addition, while the particular details below are described in connection with X.509 authentication certificates 140, it will be appreciated that other types of certificates 140 which are used to confirm or otherwise characterize the identify and/or role and/or authorization level of a user (whether for Single-Sign-On access or otherwise) can be used as a source of contextual information.

SUBJECT is a Fully Qualified Domain Name like [CN=Name, OU=Testing, OU=Test, O=Acme Corp., C=US]. SUBJECT field in the certificate can contain some or all of the following sub-fields:
country,
organization,
organizational unit,
distinguished name qualifier,
state or province name,
common name (e.g., "Anand Sinha"), and
serial number.

In addition, the SUBJECT field may also include the following (though not restricted to the list):
locality,
title,
surname,
given name,
initials,
pseudonym, and
generation qualifier (e.g., "Jr.", "3rd", or "IV"), or Also, the SUBJECT ALTERNATIVE NAME field (SubjectAltName) can contain one or more of:
electronic mail address (e.g., as defined by RFC 822),
DNS name (e.g., DNSName),
IP address, (iPAddress), and
Uniform Resource Identifier (uniformResourceIdentifier).

It must be noted that these certificates 140 are typically considered to be a highly trusted source of identity in most organizations. When the client 110 presents the certificate 140 to the server 120 that requests for it, the server 120 reads the certificate 140 for authentication. Once the authentication process is complete, the server 120 can cache data comprising at least a portion of the fields (and sub-fields) of the certificate 140 (in cache 150), such as, for example, SUBJECT and SUBJECT ALTERNATIVE NAMES values.

The cached data can then be used to automatically provide a "context" to one or more BI processes (by providing contextual information that more specifically characterizes the user). This contextual information can, in some cases, be supplemented with other contextual information (which, for example, can be obtained from the user or by accessing one or more other data sources, etc.). As an example, the cached data can be used to answer or otherwise obviate the need to answer a prompt value related to location, organization, organizational units (departments), or about a person. Contextual information can be used to filter a business intelligence process output such as a report. For example, instead of rendering a report with worldwide geographic data, contextual information can be supplied which indicates that the user is from North America and the report can be limited to displaying data pertaining to the North American market. U.S. Pat. No. 8,024,339 and U.S. patent application Ser. No. 12/546,710 (the contents of both are hereby fully incorporated by reference) describe arrangements in which contextual information is used for filtering and/or limiting access to reports or portions of reports.

The contextual information can also be used for other application such as providing additional relevancy information used when performing searches (of internal and/or external data sources). The contextual information can also be used to define/specify how records from multiple tables are combined/joined. Furthermore, the contextual information can be used to provide customized task-based workflows for the user (and provide resources relevant to the user for accomplishing the tasks). It will be appreciated that the contextual information described herein can be consumed by a large number of business intelligence processes and the foregoing examples are for illustrative purposes.

Figure 2:
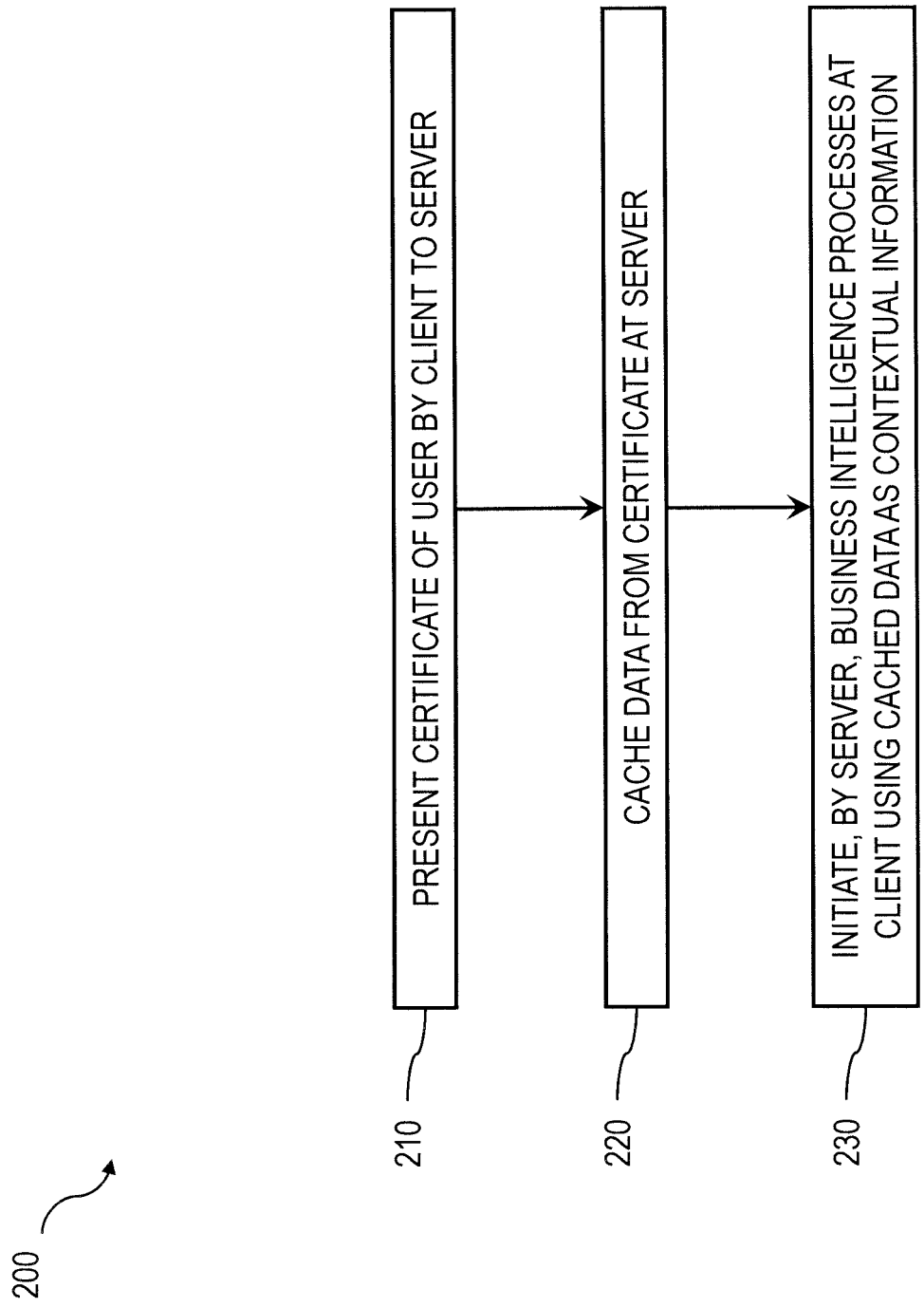
FIG. 2 is a process flow diagram illustrating the initiation of authenticated communications between a client and a server using a certificate and the use of values in the certificate to provide contextual information to one or more business processes.

FIG. 2 is a process flow diagram illustrating a method 200, in which, at 210, the client 110 presents a certificate 140 to the server 120. In this case, the certificate 140 is used to authenticate communications between the client 110 and the server 120. The server 120, at 220, caches data from the certificate 140 in a cache 150. The server, at 230, initiates one or more business intelligence processes of a business intelligence application at the client 110 using the cached data which is used to provide context to the one or more business intelligence processes.

Figure 3:
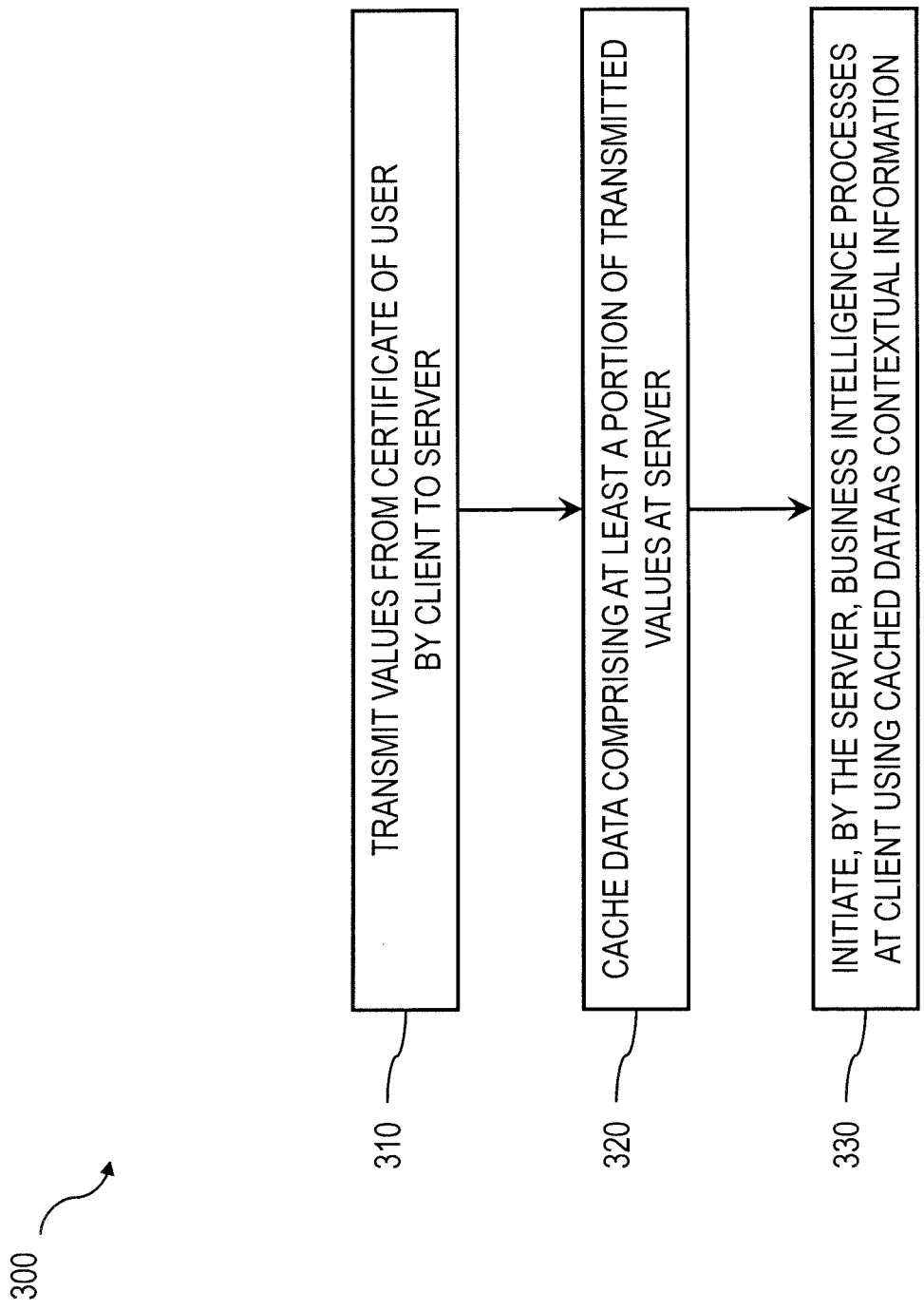
FIG. 3 is a process flow diagram illustrating the transmission of data obtained from a certificate by a client to a server and the use of the transmitted data, by the server, to provide contextual information to one or more business processes.

FIG. 3 is a process flow diagram illustrating a method 300, in which, the server 120 does not request certificates from the client 110. With this variation, the client 110, at 310, transmits values (e.g., information from the SUBJECT and SUBJECT ALTERNATIVE NAME fields, etc.) from a certificate 140 of a user to the server 120. Such certificate 140 can be used to authenticate communications between the client and the server (however the certificate 140 is not being used, in this case, for such authentication). The server 120, at 320, caches data comprising at least a portion of the transmitted values. Thereafter, at 330, the server 120 initiates one or more business intelligence processes of at least one business intelligence application at the client 110 using the cached data which, in turn, is used to provide context to the one or more business intelligence processes.

Figure 4:
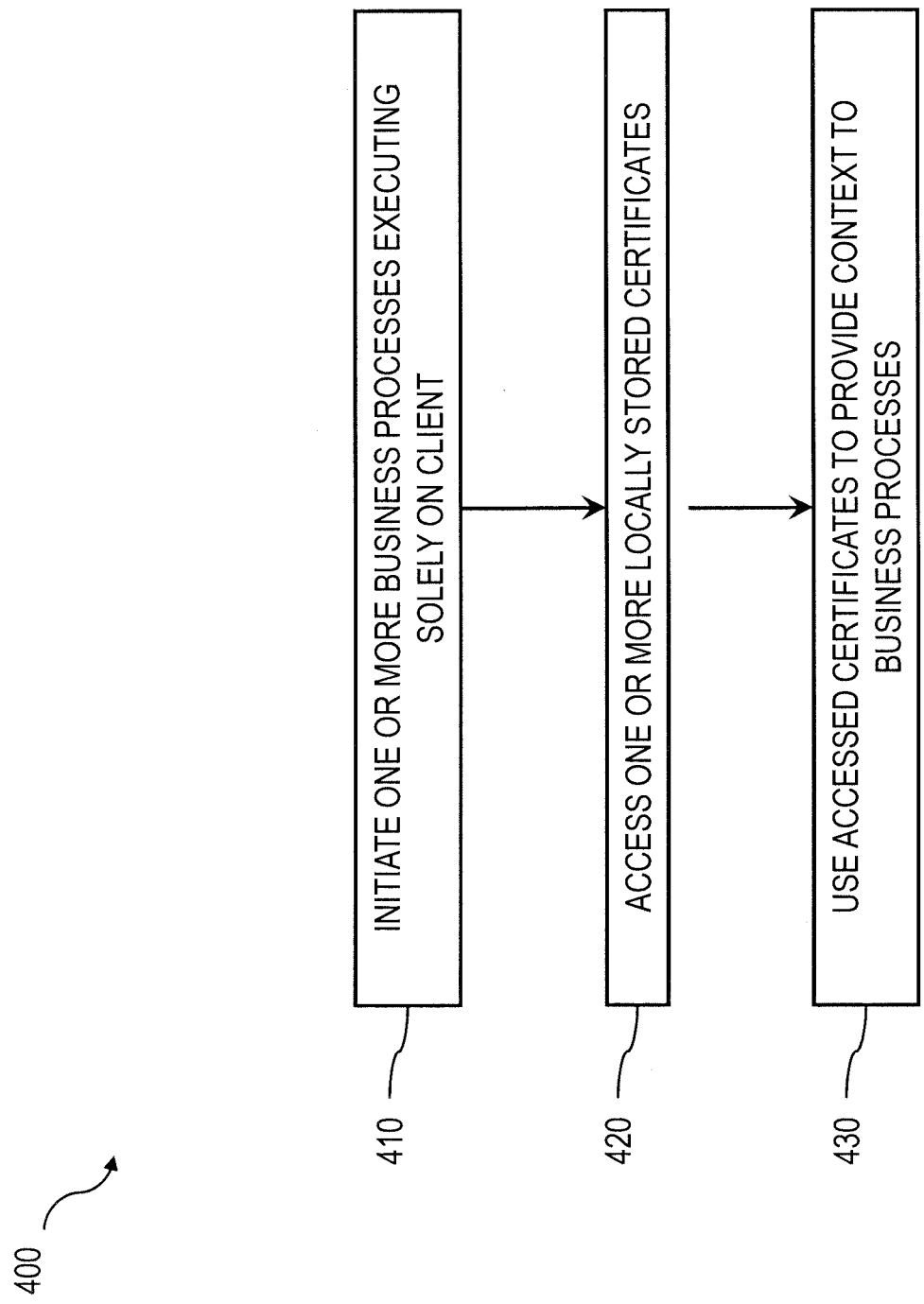
FIG. 4 is a process flow diagram illustrating the local use of values in a certificate to provide contextual information to one or more business processes executed solely on a client.

FIG. 4 is a process flow diagram illustrating a method 400 that is executed solely on the client 110. The client 110, at 410, initiates one or more business processes of a business intelligence application that are executed solely on the client 110 (as opposed to being executed partially or wholly at the server 120). The client 110, at 420, accessed one or more locally stored certificates 140. In cases in which business intelligence processes are executed on the server 120 (which is not the current case), the client 110 can present the locally stored certificates 140 to authenticate communications between the client and a server 120. Thereafter, the client 110, uses data from the accessed one or more locally stored certificates 140 to provide contextual information to the one or more initiated business processes. Locally executed business processes can include, for example, local filtering of available data, local exploration of a locally stored dataset and the like.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
presenting, by a client to a server, a certificate of a user comprising authentication information and contextual information, the authentication information being used to authenticate communications between the client and the server;
caching, at the server and after completion of an authentication process using the certificate, data from the certificate including the contextual information; and
initiating, by the server at the client, one or more business intelligence processes of at least one business intelligence application at the client using the cached data, the cached data being used to provide the contextual information to the one or more business intelligence processes, the contextual information being used by the one or more business intelligence processes for purposes other than authentication;
wherein the contextual information is used to automatically answer a prompt value, by providing contextual information that more specifically characterizes the user, required by the business intelligence process to be manually input by a user, which then performs a business intelligence process using the provided contextual information.

2. The method as in claim 1, wherein the certificate is an authentication certificate.

3. The method as in claim 2, wherein the authentication certificate is an X.509 authentication certificate.

4. The method as in claim 3, wherein the cached data comprises values from at least one of a SUBJECT field and SUBJECT ALTERNATIVE NAME field of the X.509 authentication certificate.

5. The method as in claim 4, wherein the cached data comprises values from the SUBJECT field, and wherein the SUBJECT field includes sub-fields selected from a group consisting of: country, organization, organizational unit, distinguished name qualifier, state or province name, common name, and serial number.

6. The method as in claim 4, wherein the cached data comprises values from the SUBJECT field, and wherein the SUBJECT field includes sub-fields selected from a group consisting of: locality, title, surname, given name, initials, pseudonym, and serial number.

7. The method as in claim 4, wherein the cached data comprises values from the SUBJECT ALTERNATIVE NAME field, and wherein the SUBJECT ALTERNATIVE NAME field includes sub-fields selected from a group consisting of: electronic mail address, DNS name, IP address, and uniform resource identifier.

8. The method as in claim 1, wherein the cached data is data associated with a user selected from a group consisting of: country, organization, organizational unit, distinguished name qualifier, state or province name, common name, serial number, locality, title, surname, given name, initials, pseudonym, serial number, electronic mail address, DNS name, IP address, and uniform resource identifier.

9. The method as in claim 1, wherein the contextual information is used to filter an output of the business intelligence process.

10. The method as in claim 9, wherein the output is a report.

11. The method as in claim 1, wherein the contextual information is used to perform a search as part of the business intelligence process.

12. The method as in claim 1, wherein the contextual information is used to specify a join of tables in at least one database accessed by the business intelligence process.

13. The method as in claim 1 further comprising:
supplementing the contextual information by accessing one or more other data sources for context characterizing the user.

14. A method comprising:
transmitting, by a client to a server, authentication information and contextual information from a certificate of a user, the authentication information being used to authenticate communications between the client and the server;
caching, at the server and after completion of an authentication process using the certificate, data comprising the contextual information from the certificate; and
initiating, by the server at the client, one or more business intelligence processes of at least one business intelligence application at the client using the cached data, the cached data being used to provide the contextual information to the one or more business intelligence processes, the contextual information being used by the one or more business intelligence processes to more specifically characterize the user, the contextual information being used by the one or more business intelligence processes to filter an output to specify a task-based workflow specifying tasks customized for and specifically associated for the user, the output providing resources relevant to the user for accomplishing the specified tasks;
wherein the certificate is an X.509 authentication certificate and the cached contextual information comprises values from at least one of a SUBJECT field and SUBJECT ALTERNATIVE NAME field of the X.509 authentication certificate.

15. A method comprising:
initiating, at a client, one or more business processes of at least one business intelligence application, the one or more business processes being executed solely on the client;
accessing, by the client, one or more locally stored certificates, the locally stored certificates being used to authenticate communications between the client and a remote server, the locally stored certificates each comprising authentication information and contextual information; and
using, by the client and after completion of an authentication process using the one or more locally stored certificates, data from the accessed one or more locally stored certificates to provide the contextual information to the one or more initiated business processes, the contextual information being used by the one or more business intelligence processes for purposes other than authentication;
wherein the contextual information is used to automatically answer a prompt value, by providing contextual information that more specifically characterizes the user, required by the business intelligence process to be manually input by a user via a graphical user interface, which then performs a business intelligence process using the provided contextual information.

16. The method as in claim 15, wherein the certificate is an X.509 authentication certificate.

17. The method as in claim 16, wherein the used data comprises values from at least one of a SUBJECT field and SUBJECT ALTERNATIVE NAME field of the X.509 authentication certificate.

18. The method as in claim 16, wherein the contextual information is used to specify a join of tables in at least one database accessed by the business intelligence process.

* * * * *